Figure 1:
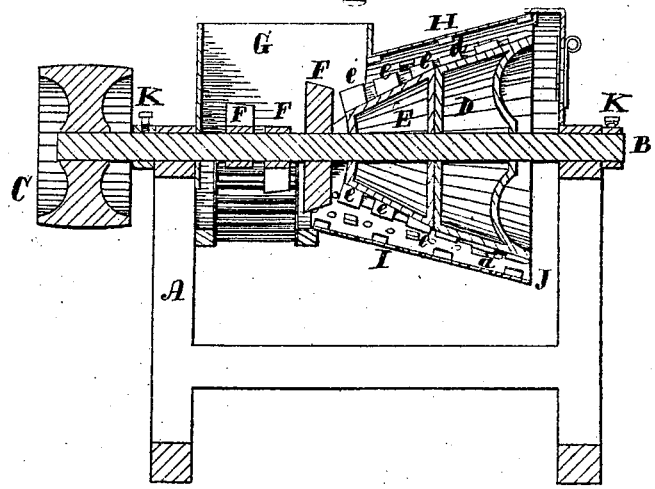

C. C. BURROUGHS.
CORN-SHELLERS.

No. 184,756. Patented Nov. 28. 1876.

WITNESSES:
Levi P. Graham
Jno. W. Lyon.

INVENTOR:
Caleb C. Burroughs,
per
Chas P. Koonsum
His Atty.

UNITED STATES PATENT OFFICE.

CALEB C. BURROUGHS, OF DECATUR, ILLINOIS.

IMPROVEMENT IN CORN-SHELLERS.

Specification forming part of Letters Patent No. 184,756, dated November 28, 1876; application filed March 28, 1876.

*To all whom it may concern:*

Be it known that I, CALEB C. BURROUGHS, of Decatur, in the county of Macon and State of Illinois, have invented a new and useful Improvement in Corn-Shellers, which improvement is fully set forth in the following specification, reference being had to the accompanying drawings.

My invention relates to an improvement in that class of corn-shellers in which a conical cylinder is used, and consists in the construction of the conical cylinder in two parts, in the form of a broken cone, with the apex of the smaller cylinder on a less acute angle than the larger cylinder, making the surfaces of the two cones on different planes, and with the teeth on the smaller cylinder of a greater length at the apex than at the base of the same, while the teeth on the larger cylinder are of a more uniform length, the object of which is to give a larger shelling-surface at the throat of the machine by the increase of the size and length of the teeth, and equalizing the shelling-surface throughout both of the cylinders.

The shelling-surface on the apex of the smaller cylinder being less, the increase in the length, breadth, and thickness of the teeth, increases the shelling-surfaces thereat, so that uniformity of shelling-surface and uniformity in amount of shelling are equalized throughout both the smaller and larger of the cones.

Also, in combination with the above-described cylinders are beaters or feeders on the cylinder-shaft, and directly under the hopper, to prevent the corn from arching in the hopper, and preparing the corn for the cylinders by partially shelling and forcing the corn to the shelling-surfaces of the cylinders and casing.

Figure 1 is a vertical tranverse section of a corn-sheller embodying my invention.

A is the frame; B, the cylinder-shaft, operated through the pulley C. D is the larger conical cylinder, with the teeth $d\ d$ of a uniform length. E is the smaller cylinder, constructed on a different plane, and at a less acute angle than the large cylinder, and with the teeth $e\ e$, of irregular length, increasing in size toward the apex of the cone. F F are beaters or feeders on the cylinder-shaft, and directly under the hopper G. H is the upper casing, and I the lower casing, both provided with teeth, the lower casing being suitably perforated for the discharge of the shelled corn, the cobs being discharged at J.

The shaft and cylinders can be moved horizontally in the casing, and secured by means of the collars K K, to give a greater or less space between the cylinders and the casing, as may be required, owing to the condition of the grain.

I claim as my invention—

1. The tapering cylinder E, provided with the teeth $e\ e$, made of greater length, breadth, and thickness toward the smaller end of the cylinder, as and for the purpose set forth.

2. The beaters or feeders F F, arranged on the shaft directly under the hopper H, in combination with the cylinders D E, as shown and described.

3. The arrangement of the two cylinders D E with teeth $d\ d$ and $e\ e$, respectively, as shown and described, and beaters or feeders F F, as and for the purpose set forth.

CALEB C. BURROUGHS.

Witnesses:
LEVI P. GRAHAM,
JNO. W. LYON.